(12) United States Patent
Niebling et al.

(10) Patent No.: US 8,007,180 B2
(45) Date of Patent: *Aug. 30, 2011

(54) SEALING ARRANGEMENT

(75) Inventors: Peter Niebling, Bad Kissingen (DE); Jens Heim, Schweinfurt (DE); Heinrich Hofmann, Schweinfurt (DE); Darius Dlugai, Schweinfurt (DE); Roland Langer, Schwanfeld (DE)

(73) Assignee: Schaeffler KG, Schweinfurt (DE)

( * ) Notice: Subject to any disclaimer, the term of this patent is extended or adjusted under 35 U.S.C. 154(b) by 158 days.

This patent is subject to a terminal disclaimer.

(21) Appl. No.: 12/508,971

(22) Filed: Jul. 24, 2009

(65) Prior Publication Data

US 2009/0285516 A1 Nov. 19, 2009

Related U.S. Application Data

(62) Division of application No. 10/569,837, filed as application No. PCT/DE2004/001857 on Aug. 20, 2004, now Pat. No. 7,632,020.

(30) Foreign Application Priority Data

Aug. 25, 2003 (DE) .................................. 103 38 956

(51) Int. Cl.
*F16C 41/00* (2006.01)
(52) U.S. Cl. ........................................ 384/448; 384/486
(58) Field of Classification Search .................. 384/448, 384/486; 324/174, 207.25
See application file for complete search history.

(56) References Cited

U.S. PATENT DOCUMENTS

| | | | | |
|---|---|---|---|---|
| 4,799,808 A | * | 1/1989 | Otto ............................... | 277/349 |
| 5,293,124 A | * | 3/1994 | Caillaut et al. ................ | 324/173 |
| 5,640,087 A | * | 6/1997 | Alff ................................ | 324/173 |
| 5,873,658 A | * | 2/1999 | Message et al. ............... | 384/448 |
| 5,883,511 A | * | 3/1999 | Foster ............................ | 324/174 |
| 6,003,871 A | * | 12/1999 | Poll ................................ | 277/309 |
| 6,190,051 B1 | * | 2/2001 | Angelo et al. ................. | 384/448 |
| 6,585,420 B2 | * | 7/2003 | Okada et al. .................. | 384/448 |
| 6,605,938 B1 | * | 8/2003 | Sentoku et al. ............... | 324/174 |
| 6,637,754 B1 | * | 10/2003 | Ohtsuki et al. ................ | 277/549 |
| 6,943,542 B2 | * | 9/2005 | Sentoku et al. ............... | 324/174 |
| 7,632,020 B2 | * | 12/2009 | Niebling et al. .............. | 384/448 |
| 2001/0000713 A1 | * | 5/2001 | Nakamura et al. ............ | 384/448 |

FOREIGN PATENT DOCUMENTS

| | | | |
|---|---|---|---|
| DE | 69609641 | | 4/2001 |
| EP | 1447240 A2 | * | 8/2004 |
| GB | 2207470 A | * | 2/1989 |
| JP | 2001056236 A | * | 2/2001 |
| JP | 2002328133 A | * | 11/2002 |

OTHER PUBLICATIONS

German Search Report (4 pages).

* cited by examiner

*Primary Examiner* — Thomas R Hannon
(74) *Attorney, Agent, or Firm* — Lucas & Mercanti, LLP

(57) ABSTRACT

The invention relates to a sealing arrangement that seals at least one radial intermediate space between at least one inner bearing ring and at least one outer bearing ring. Said sealing arrangement comprises at least one first support that supports at least one elastic seal and a second support which supports at least one encoder located outside the intermediate space. The encoder is radially oriented towards at least one sensor that is disposed above the encoder in a radially outward direction.

7 Claims, 6 Drawing Sheets

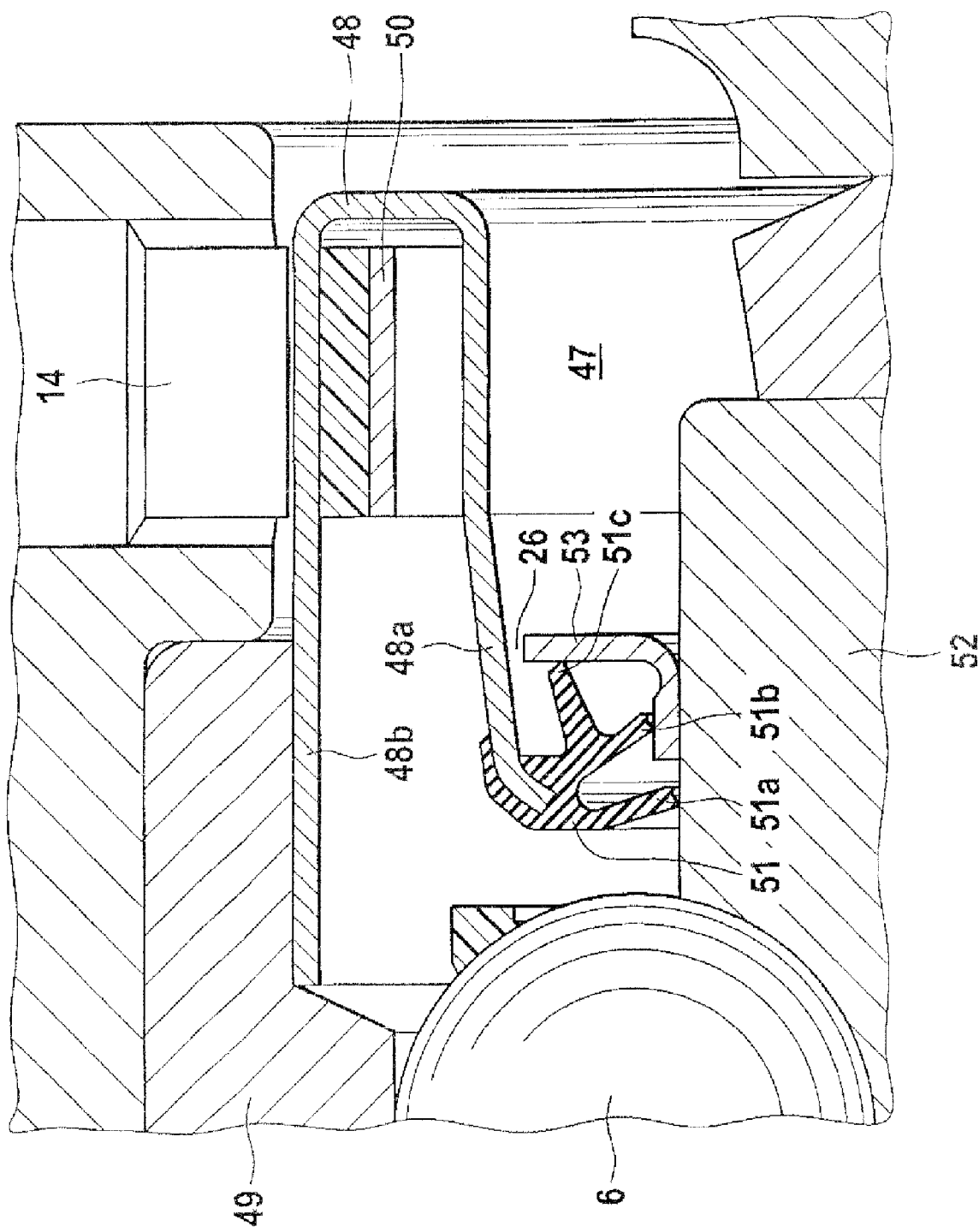

SEALING ARRANGEMENT

This application is a Divisional of U.S. application Ser. No. 10/569,837 filed Apr. 18, 2006, which in turn is a 371 of PCT/DE2004/001857 filed Aug. 20, 2004, which in turn claims the priority of DE 103 38 956.3 filed Aug. 25, 2003, the priority of these applications is hereby claimed and these applications are incorporated by reference herein.

FIELD OF THE INVENTION

The invention relates to a sealing arrangement which seals at least one and at least one outer bearing ring, it being the case that the sealing arrangement
- is provided with at least a first support, the first support bearing at least one elastic seal,
- has a second support, the second bearing at least one encoder arranged outside the interspace, and the encoder being oriented radially toward at least one sensor arranged above the encoder in the radially outward direction,
- has a dirt deflector on the inner bearing ring, the dirt deflector and the first support being arranged such that they can be rotated relative to one another, and the seal butting at least against the dirt deflector.

BACKGROUND OF THE INVENTION

Such a sealing arrangement is described in FR 266 79 47 A1. The encoder in this case is an impulse ring which is formed integrally with the dirt deflector made of sheet metal. The encoder is located axially outside the outer bearing ring and radially opposite a sensor. The encoder has hardly any protection, if any at all, against contamination, this making it very possible for malfunctioning of the sensor unit to occur in the event of heavy contamination.

SUMMARY OF THE INVENTION

The object of the invention is to provide a sealing arrangement for a bearing unit, in particular for wheel bearings of vehicles, which is cost-effective to produce, is of compact design, can easily be installed as a structural unit, and of which the bearing with sensor unit is, as far as possible, unaffected by contamination from the outside.

This object is achieved in accordance with the subject matter of claim 1 and is configured in combination with the features of the dependent claims.

The interspace of the bearing is predetermined by the geometry of the outer bearing ring and the configuration of the inner bearing ring. The interspace is bounded radially by the inner lateral surface of the outer bearing ring and by the outer lateral surface of the inner bearing ring. The rolling bodies and the cages of the bearing are arranged in the interspace. The interspace terminates axially at imaginary planes which are oriented perpendicularly to the bearing axis and extend from the end surfaces of this bearing ring. The inner ring is usually wider than the outer ring and thus passes through at least one of these planes on that side of the bearing on which the encoder is seated, and has the encoder engaging around it. The encoder axially adjoins optionally the outer ring or interspace or is arranged radially outside the outer ring.

The term encoder stands for one or more encoders in one or more parts which is/are arranged circumferentially in relation to the bearing axis. The encoder is optionally an impulse ring made of sheet metal with free spaces which are bounded by crosspieces in the circumferential direction or a sheet-metal ring which has a circumferentially shaft-like design. As an alternative to this, the encoder is alternately polarized from or with magnetized material. Examples of such materials are plastic to which magnetizable material has been added or plastics which contain magnetizable inserts. Alternatively, the encoder is made of magnetized metal.

Arranging the encoder outside the bearing interspace has the advantage of more space being available for the seals of this sealing arrangement. In comparison with axially oriented encoders, the sensor unit with a radially outwardly oriented encoder takes up less radial overall height. The amount of installation space gained can be utilized, in addition, for optimum configuration of the seal since, between the bearing rings, there is only a small amount of radial space in any case for the installation of a seal.

One or more sensors arranged radially outside the encoder picks/pick up the signals of the encoder mainly radially, irrespective of other possible scatterings of these signals, or transmits signals radially in the direction of the encoder. For this purpose, the encoder has its alternatively signal-receiving, signal-reflecting or signal-generating side oriented radially outward, and the encoder is arranged on the rotating bearing ring. The sensor(s) either is/are seated on the bearing ring which cannot be rotated in relation to the rotating bearing ring or is/are fixed to the vehicle in some other way.

In wheel-bearing units, the outer bearing rings often move out axially, in relation to their ideal position with respect to the inner bearing ring, in the order of magnitude of operational play. In prior-art sealing arrangements in which the encoder is tapped axially by the sensor, the outward movement has an adverse effect on the, in this case, axial gap spacing between the encoder and sensor. As the gap width increases, transmission becomes less accurate. In contrast, since it is formed radially, the extent of the gap between the encoder and the sensor of a sealing arrangement according to the invention is not affected by the bearing ring moving outward. All that is required is for the possible offset produced by the outer bearing ring moving outward to be taken into account from the outset in the overall width of the encoder. The sensor arrangement is thus less susceptible to malfunctioning.

A sealing arrangement protected by a covering element according to the subject matter of the characterizing part of claim 1 is optimally protected against external environmental influences by all constituent parts. The covering element is usually designed in the form of a covering cap and, depending on further functions in addition to the covering function, is formed optionally from plastic or metals, but preferably from ferromagnetic sheet iron or sheet steel. The covering element and the support made of sheet metal are preferably cold-formed by cold-working methods such as bending, rolling, drawing, stamping and punching. The covering element assists the sealing function of the sealing arrangement of the bearing.

The sealing arrangement is preferably provided for installation in wheel-bearing sets of motor vehicles of all conceivable embodiments. This applies, inter alia, to two-row and four-row wheel-bearing sets with rollers or balls as rolling bodies, in particular in the form of angular roller bearings or angular ball bearings. The wheel-bearing sets optionally have single-part bearing rings for with bearing surfaces for all of the rows, split bearing rings or one bearing ring for each row and combinations of these configurations. Inner bearing rings are preferably heated on a hub, the mounting preferably being play-free as a result of a flanged rim or using any other conceivable means on the hub. The outer bearing ring is optionally formed in a single part with one or more flanges for fastening the wheel-bearing unit on the vehicle or wheel, or these bearing rings are introduced into a corresponding flange housing. Alternatively, either the inner or the outer bearing rings are rotationally fixed in relation to the vehicle or rotate with the vehicle wheel.

The seal is formed from the customarily used materials, such as elastomers, and, as an alternative, also has radially prestressing worm springs.

The sealing arrangement is preferably designed as a cassette seal. The essential elements of the sealing arrangement are combined to form a self-retaining structural unit (cassette seal) comprising supports, covering cap, seal and encoder. This simplifies the storage, transportation and installation in the bearing unit. The sealing arrangement can be exchanged for prior-art sealing arrangements without the design of the bearing unit having to undergo installation-space-specific changes.

BRIEF DESCRIPTION OF THE DRAWINGS

Further configurations of the invention and exemplary embodiments of the invention are explained in more detail hereinbelow with reference to FIGS. 1 to 8, in which, specifically:

FIG. 8 shows a further sectional illustration of an exemplary embodiment of a sealing arrangement in which the covering element and the support for the seal and the support for the encoder are formed in one piece.

DETAILED DESCRIPTION OF THE DRAWINGS

Figure 1:
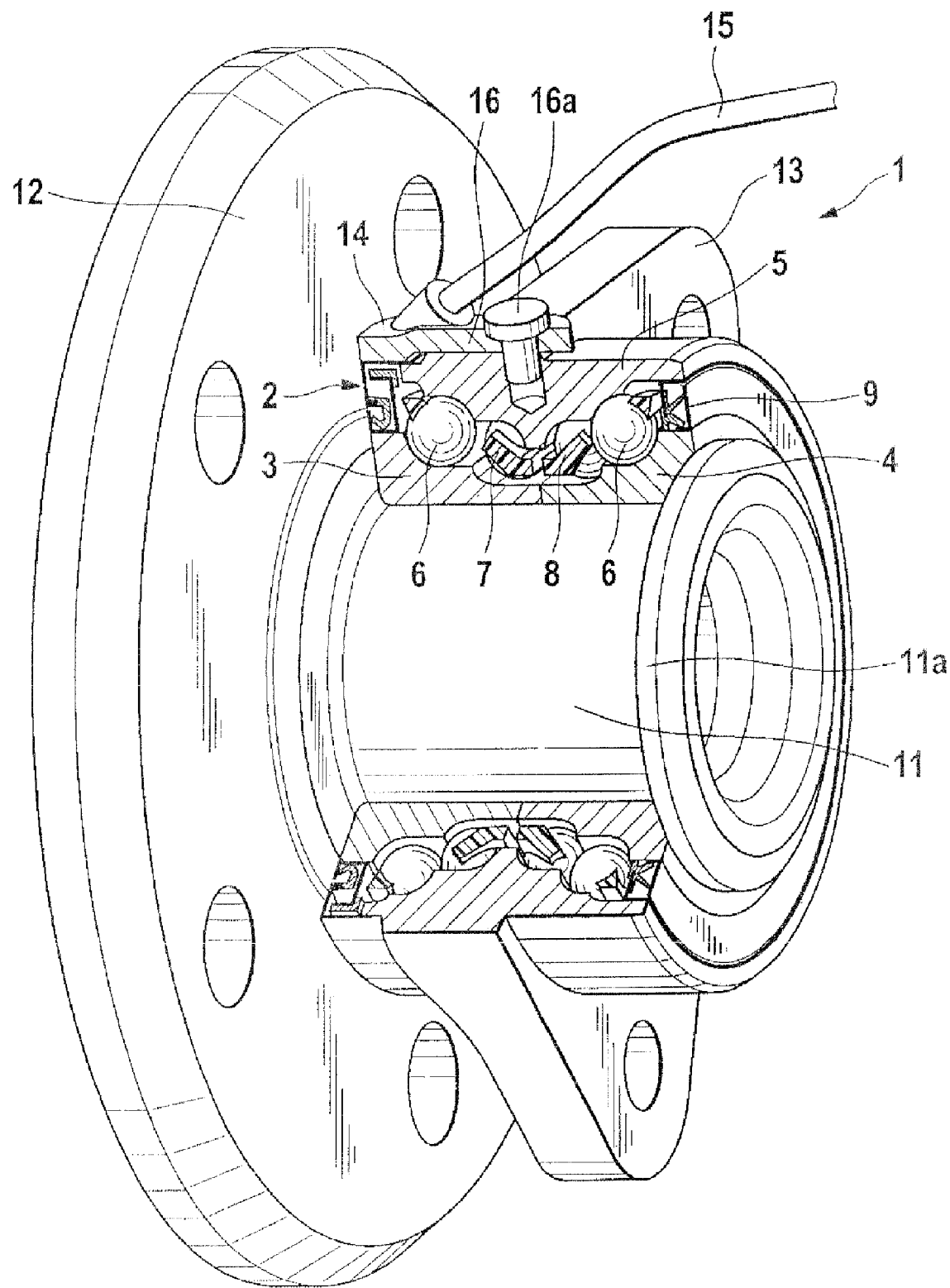
FIG. 1 shows an overall view of a wheel-bearing unit, partly in section, with a sealing arrangement according to the invention.

FIG. 1 shows an overall view, illustrated partly in section, of a wheel-bearing unit 1 in which a sealing arrangement 2 according to the invention is installed. The wheel-bearing unit 1 has a wheel-bearing set comprising two inner bearing rings 3 and 4 and an outer bearing ring 5, two rows of rolling bodies 6, in the form of balls, and cages 7 and 8. The inner bearing rings 3 and 4 are seated on a hub 11. The wheel-bearing unit is designed in the form of a two-row angular ball bearing and is prestressed in a play-free manner by means of a flanged rim 11a of the hub 11. A flange 12 for fastening a vehicle wheel (not illustrated) is formed integrally with the hub 11. The wheel-bearing unit 1 is fastened on the vehicle via a further flange 13. It is therefore the case that the outer bearing ring 5 is assigned to the vehicle (not illustrated) in a rotationally fixed manner and the inner bearing rings 3 and 4 can be rotated relative to the outer bearing ring 5.

The wheel-bearing set is sealed by a cassette seal 9 in one axial direction and by means of the sealing arrangement 2 in the other axial direction. The sealing arrangement 2 is assigned a sensor unit comprising an encoder 10 and a sensor 14. The encoder 10 is integrated in the sealing arrangement 2.

The sensor 14 is seated radially outside the sealing arrangement 2 and radially above the sealing arrangement 2. A connection 15 leads from the sensor 14 to the vehicle. The sensor 14 is fixed on the outer bearing ring 5 by means of a fastening element 16. The fastening element 16 extends axially from the sensor 14 and goes partially radially beyond the outer bearing ring 5. A bolt 16a, which has optionally been pressed in, screwed in or is fixed in some other way, retains the sensor 14 on the outer bearing ring 5 via the fastening element 16. It is advantageous for the sensor 14 to be fastened on the outer-vehicle, mounted bearing ring 5 since the wheel-bearing unit together with the sensor(s) can be supplied in preassembled form as a subassembly and installation on the vehicle is simplified. Optimum positioning of the connection 15 between the in any case narrow interspace between the vehicle wheel and the axle suspension is possible.

Figure 2:
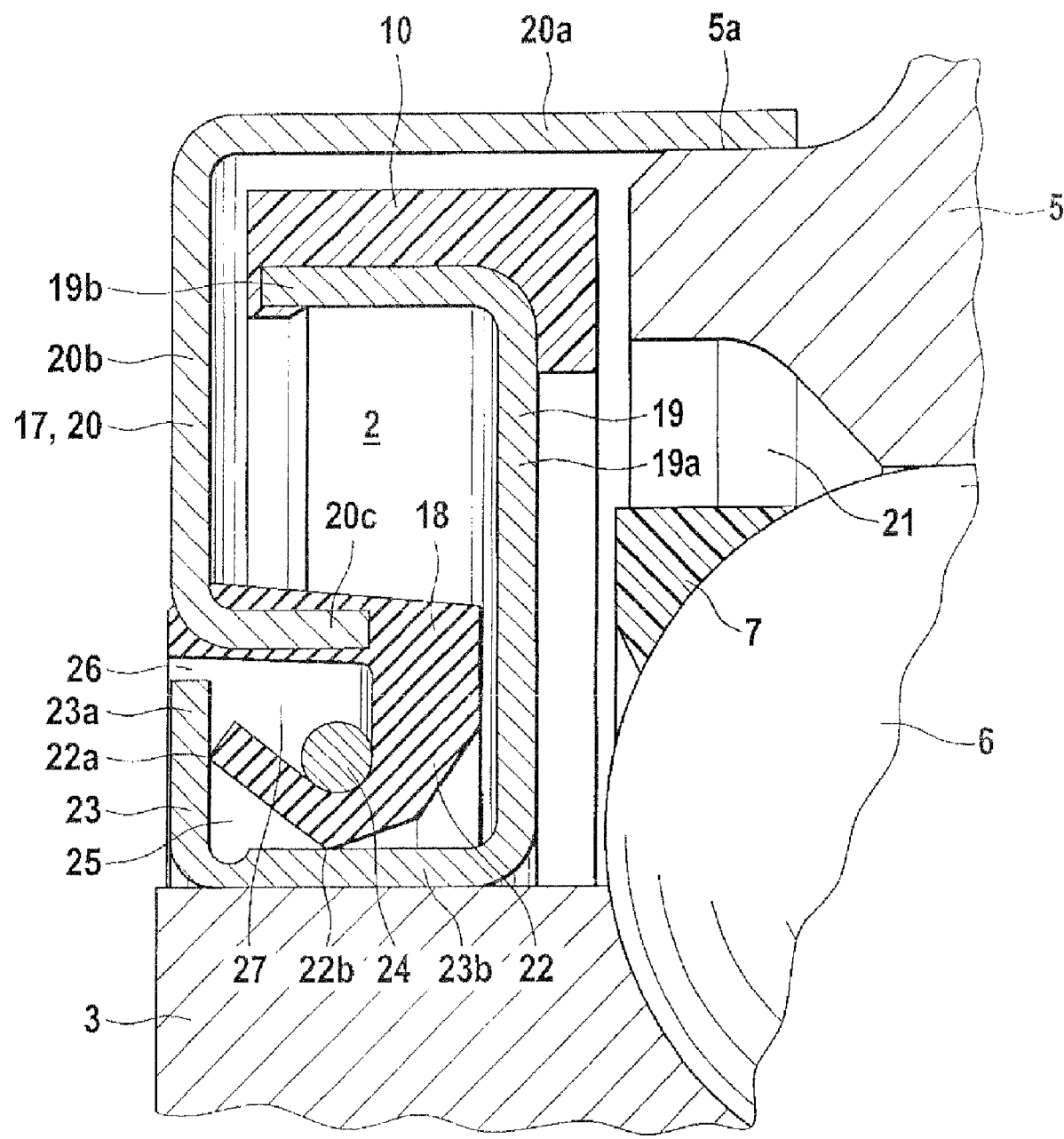
FIG. 2 shows a partial view, in section, of one exemplary embodiment of the sealing arrangement.

The sealing arrangement is illustrated in detail in a sectional illustration in FIG. 2 and has a first support 17, on which a seal 18 is fixed. Furthermore, the sealing arrangement has a second support 19 with the encoder 10. The encoder 10 is a ring made of plastic with optionally magnetically polarized additions or inserts. The sealing arrangement 2 is covered, for the most part, by means of a covering element 20. The covering element 20 is formed integrally, in a cap-like manner, with the first support 17 made of sheet metal and is fixed on the outside of a surface section 5a of the outer bearing ring 5. For this purpose, the covering element 20 is seated with a hollow-cylindrical section 20a pressed on the surface section 5a and, first of all, extends axially away from the outer bearing ring 5 between the sensor 14 and the encoder 10. As it progresses, the covering element 20 extends radially inward on a plate-like section 20b. The encoder 10 is covered in the outward direction and protected against contamination radially and axially, and the same is the case for the interspace 21 axially, by means of the section 20b.

Finally, the covering element 20 terminates in a hollow-cylindrical section 20c which is angled from the section 20b and extends in the direction of the rolling bodies 6. The seal 18 is fixed on the section 20c. The seal 18 has a sealing lip 22 with two sealing edges 22a and 22b. The sealing edge 22a butts against a dirt deflector 23 in the axial direction.

The dirt deflector 23 is an angled ring, of which one leg 23a is directed radially outward away from the inner bearing ring 3. Moreover, the dirt deflector 23 is formed integrally with the second support 19 made of sheet metal and, for this purpose, is connected to the support 19 via the other leg 23b. The second sealing edge 22b butts radially against the leg 23b, this being prestressed to a pronounced extent by the action of a worm spring 24. That section of the sealing lip 22 which is bounded by the sealing edges 22a and 22b and sub-sections of the legs 23a and 23b bound an annular cavity 25, which is optionally filled with grease. The leg 23a forms a gap seal, defined by the gap 26, between the dirt deflector 23 and the covering element 20 and/or between the dirt deflector 23 and the seal 18. It is also the case that liquid which has penetrated into the front space 27 passes outward away from the seal 18 again, by way of gravitational or centrifugal forces, via the gap 26.

The second support 19 merges into the dirt deflector 23 at the leg 23b and thus, located at least partially radially between the seal 18 and the inner bearing ring 3, first of all extends axially in the direction of the rolling bodies 6 and is then angled radially outward. In this case, the support 19 runs axially, in the form of a plate-like section 19a, between the rolling bodies 6 and the cage 7 on one side and radially outward between the seal 18, the dirt deflector 23 and the covering element 20 on the other side. A hollow-cylindrical supporting section 19b is angled from the section 19a, this supporting section being oriented axially in the direction of the covering element 20 and having the encoder 10 seated on it radially between the supporting section 19b and the section 20a.

Figure 3:
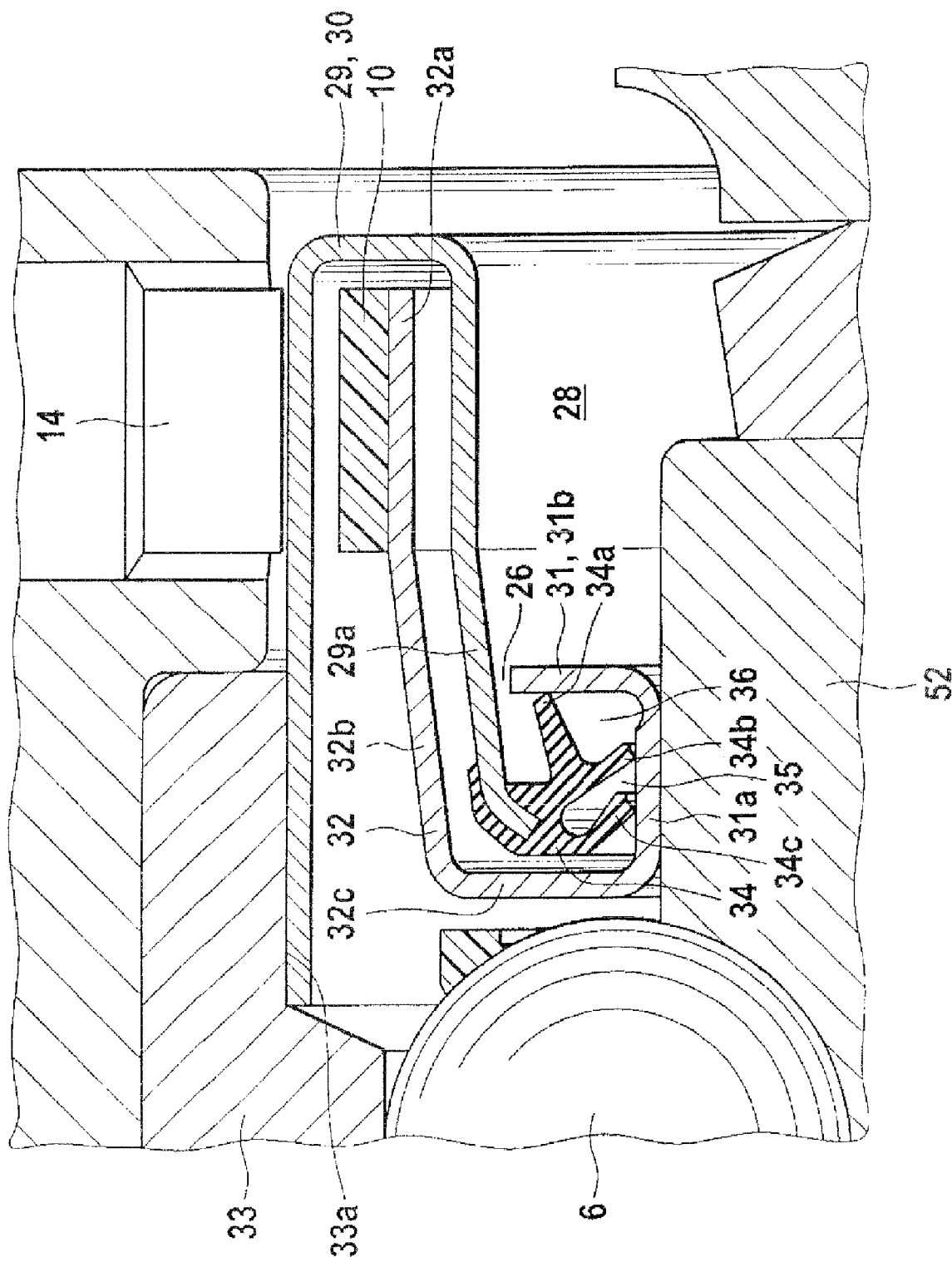
FIG. 3 shows a partial view, in section, of a further exemplary embodiment of the sealing arrangement.

FIG. 3 shows an alternative configuration of a sealing arrangement 28. The sealing arrangement 28 is similar to the design of the sealing arrangement 2 in terms of assignment and number of elements in principle—but at least to the extent where, in the sealing arrangement 28, a covering element 29 is formed integrally with a first support 30 and a dirt deflector 31 is formed integrally with a second support 32. The encoder 10 is seated radially on a supporting section 32a, which merges into a plate-like section 32c via a conical section 32b. The plate-like section 32c then progresses into a leg 31a of the dirt deflector 31.

The covering element 29 is fixed on an inner surface 33a of an outer, rotationally fixed bearing ring 33 and engages around the encoder 10 axially in one direction and radially in both directions. The encoder 10 is thus covered in the radially outward and the radially inward directions and in the axially outward direction by the covering element 29. A seal 34 is fixed on a conically running rotationally symmetrical section 29a. The seal 34 has three elastic sealing lips 34a, 34b and 34c. The sealing lip 34a butts axially against the leg 31b of the dirt deflector 31. The sealing lips 34b and 34c are prestressed radially against the leg 31a. The annular cavities 35 and 36 are optionally filled with grease. Preliminary sealing is achieved between the section 29a and the leg 31 via the gap 26.

Figure 5:
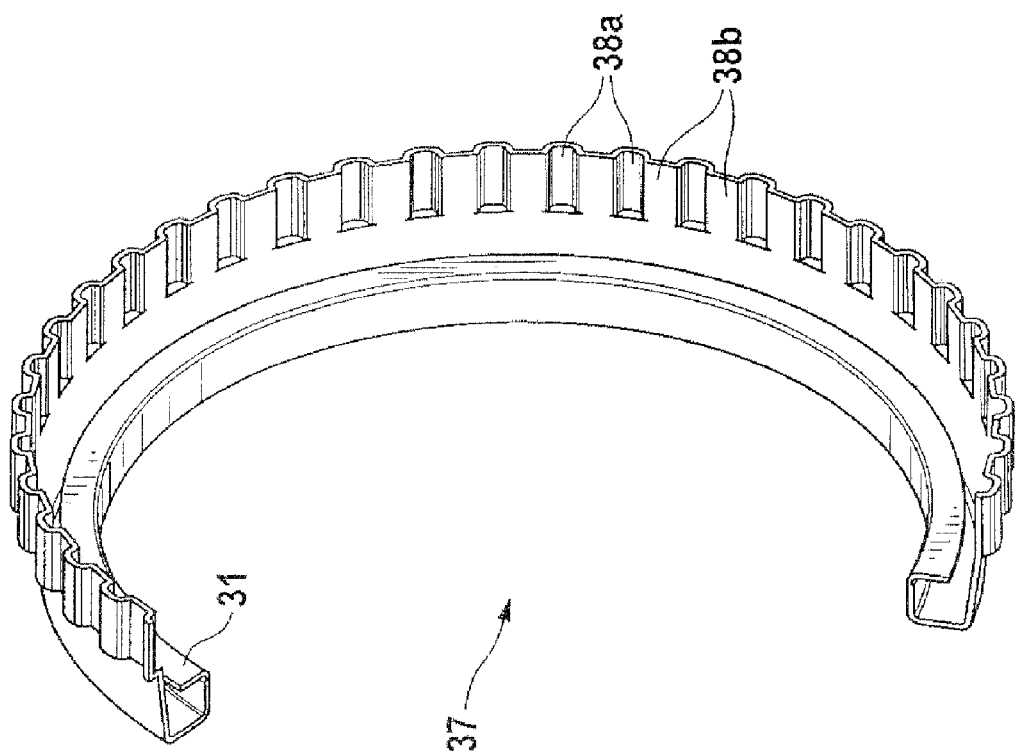
FIGS. 4 and 5 show alternative exemplary embodiments of encoders in an overall view, partly in section.
Figure 4:
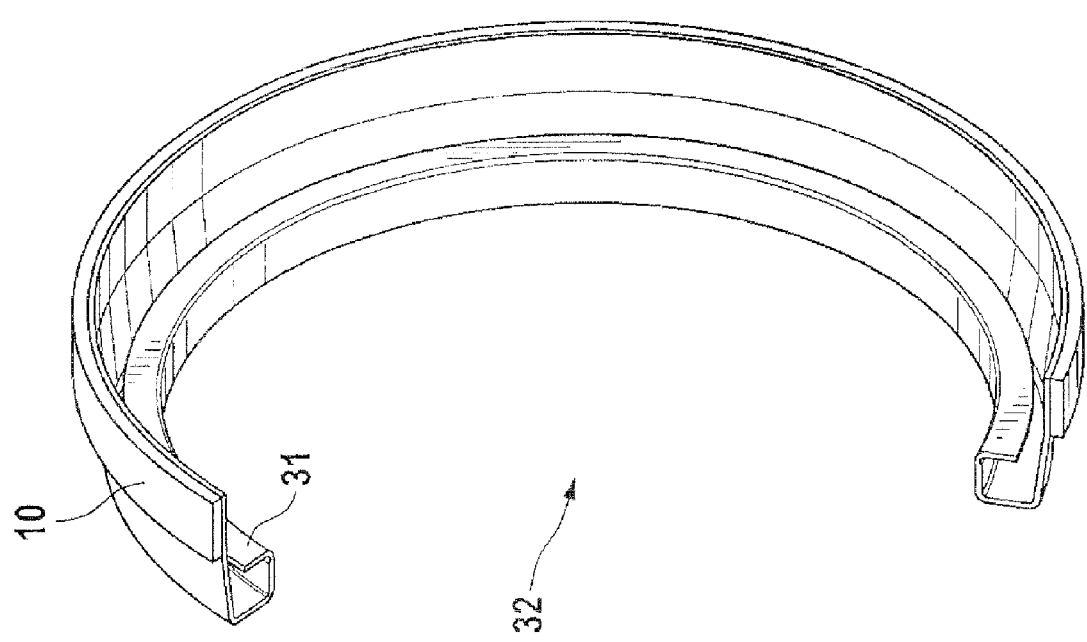

FIGS. 4 and 5 show alternative configurations of the second support 32, 37, respectively. The support 32 according to FIG. 4 accommodates an encoder 10 made of a plastic. The plastic is mixed with magnetizable particles. The support 37 is formed integrally with the dirt deflector 31 and integrally with an encoder 38. The encoder 38 has identical elevations 38a which are formed in the radially outward direction from the sheet metal of the support 37, are arranged at a uniform spacing apart from one another on the circumference of the encoder 38 and are separated from one another by depressions 38b. As an alternative, there are also encoders in which the depressions 38b and the elevations 38a are replaced by circumferentially alternating cutouts/punchings and crosspieces (counting ring).

Figure 6:
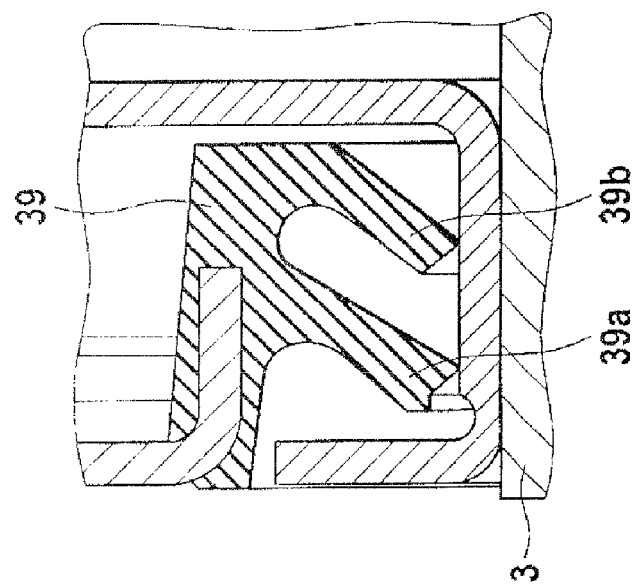
FIG. 6 shows a sectional illustration of a further exemplary embodiment of a sealing arrangement with an encoder seated on an outer bearing ring.

FIG. 6 illustrates a seal 39 as an alternative to the seals 18 or 34 according to FIG. 2 or 3, respectively. The seal 39 has two sealing lips 39a and 39b which rest radially in the direction of the inner bearing ring 3.

Figure 7:
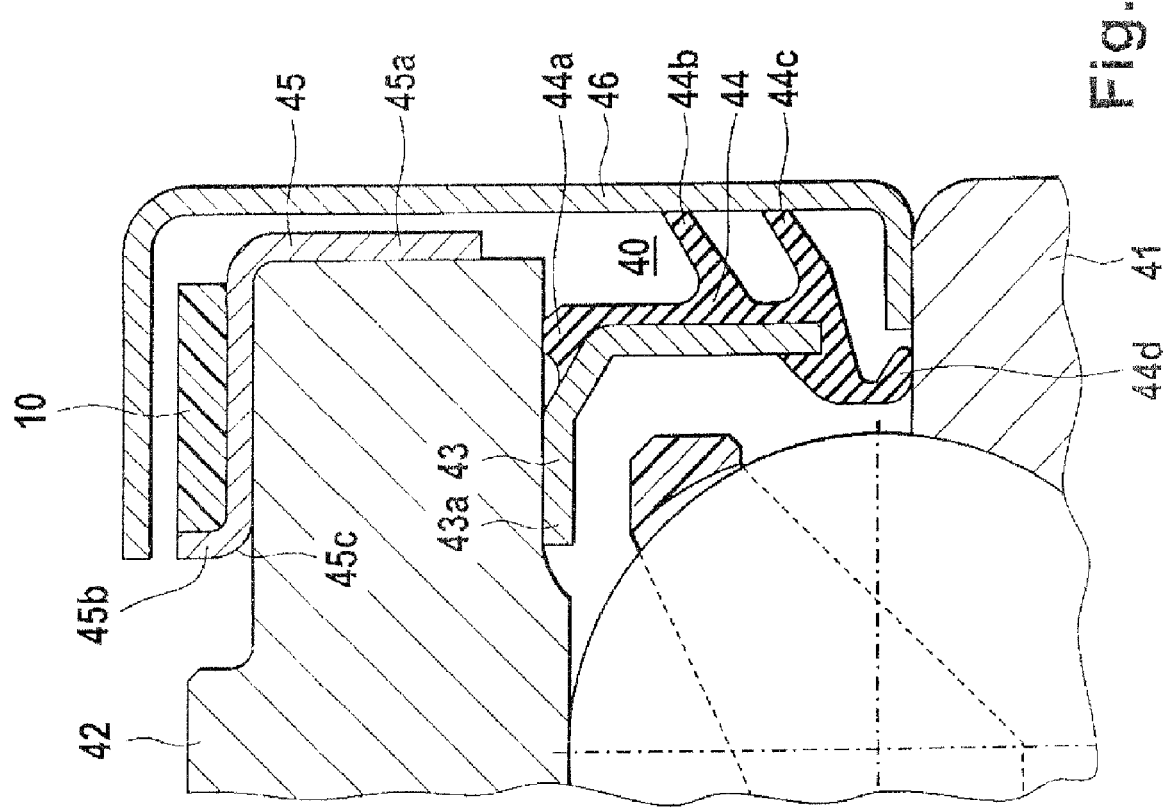
FIG. 7 shows a sectional illustration of an exemplary embodiment of a sealing arrangement in which the covering element and the support for the seal and the support for the encoder are formed in one piece.

FIG. 7 shows a sealing arrangement 40 between an inner, vehicle-mounted bearing ring 41 and an outer, rotatable bearing ring 42. The sealing arrangement 40 is formed from a first support 43 with a seal 44, from a second support 45 with encoder 10 and from a covering element 46 which is formed integrally with a dirt deflector and is in the form of a covering cap.

The first support 43 is fastened in the outer bearing ring 42 by means of a hollow-cylindrical section 43a and is angled radially inward in the direction of the inner bearing ring 41. The seal 44 covers that side of the first support 43 which faces axially in the direction of the covering element 46 and, in addition, it seals the outer bearing ring 42 statically by means of a bead 44a. The seal 44 butts axially against the covering element 46 by way of the sealing lips 44b and 44c. A further sealing lip 44d seals radially against the inner bearing ring 41.

The second support 45 is an angled ring made of sheet metal which is seated on the outer bearing ring 42 in the radially outward direction and accommodates the encoder 10 on its outer circumference. The angled ring has a radial leg 45a which butts against the end side of the outer bearing ring 42. The leg 45a is an axial stop which, during installation of the encoder 10, defines the axial position of the encoder 10 in relation to a sensor located radially above the encoder. A leg 45b of the angled ring is oriented radially outward and protects the end side of the encoder in an axial direction against contamination and damage. The edge rounding 45c between the leg 45 and the cylindrical section 45d makes it easier for the encoder 10 to be pressed onto the outer bearing ring 42. The covering element 46 is fixed on the inner bearing ring 41 and engages partially over the outer bearing ring 42 in the radial direction and fully over the encoder 10 in the radial direction. Moreover, the covering element 46 covers the seal 44 fully in the axial direction.

FIG. 8 shows a sealing arrangement 47 in which the first support 48a and the second support 48b and the covering element 48 are formed in one piece as a unit. The second support 48 in this case is of cylindrical design and is fixed inside an outer, rotatable bearing ring 49. The encoder 10 is fixed on the inside of the second support. The encoder 10 is reinforced radially with a reinforcement 50. The second support 48b merges into the first support 48a, at the free end of which is fixed a seal 51 with the sealing lips 51a, 51b, 51c. The sealing lip 51a butts directly against the inner bearing ring 52. The sealing lips 51b, 51c are prestressed axially against a dirt deflector 53 designed as an angled ring. The multifunctional covering element 48 rotates with the outer bearing ring 49, the vehicle-mounted sensor 14 tapping the encoder 10 radially and the seal 51 moving on the dirt reflector 53 and the inner bearing ring 52.

| Designations | |
|---|---|
| 1 | wheel-bearing unit |
| 2 | sealing arrangement |
| 3 | inner bearing ring |
| 4 | inner bearing ring |
| 5 | outer bearing ring |
| 5a | surface section |
| 6 | rolling body |
| 7 | cage |
| 8 | cage |
| 9 | cassette seal |
| 10 | encoder |
| 11 | hub |
| 11a | flanged rim |
| 12 | flange |
| 13 | flange |
| 14 | sensor |
| 15 | connection |
| 16 | fastening element |
| 16a | bolt |
| 17 | first support |
| 18 | seal |
| 19 | second support |
| 19a | section |
| 19b | supporting section |
| 20 | covering element |
| 20a | section |
| 20b | section |
| 20c | section |
| 21 | interspace |
| 22 | sealing lip |
| 22a | sealing edge |
| 22b | sealing edge |
| 23 | dirt deflector |
| 23a | leg |
| 23b | leg |
| 24 | worm spring |
| 25 | cavity |

-continued

| Designations | |
|---|---|
| 26 | gap |
| 27 | front space |
| 28 | sealing arrangement |
| 29 | covering element |
| 29a | section |
| 30 | first support |
| 31 | dirt deflector |
| 31a | leg |
| 32 | second support |
| 32a | supporting section |
| 32b | conical section |
| 32c | plate-like section |
| 33 | outer bearing ring |
| 33a | inner surface |
| 34 | seal |
| 34a | sealing lip |
| 34b | sealing lip |
| 34c | sealing lip |
| 35 | cavity |
| 36 | cavity |
| 37 | second support |
| 38 | encoder |
| 38a | elevation |
| 38b | depression |
| 39 | seal |
| 39a | sealing lip |
| 39b | sealing lip |
| 40 | sealing arrangement |
| 41 | inner bearing ring |
| 42 | outer bearing ring |
| 43 | first support |
| 43 | section |
| 44 | seal |
| 44a | sealing bead |
| 44b | sealing lip |
| 44c | sealing lip |
| 44d | sealing lip |
| 45 | second support |
| 45a | leg |
| 45b | leg |
| 45c | edge rounding |
| 45d | section |
| 46 | covering element |
| 47 | sealing arrangement |
| 48 | covering element |
| 48a | first support |
| 48b | second support |
| 49 | outer bearing ring |
| 50 | reinforcement |
| 51 | seal |
| 51a | sealing lip |
| 51b | sealing lip |
| 51c | sealing lip |
| 52 | inner bearing ring |
| 53 | dirt deflector |

The invention claimed is:

1. A sealing arrangement which seals at least one radial interspace between an outer lateral surface of at least one inner bearing ring and an inner lateral surface of at least one outer bearing ring, the radial interspace being a hollow region bounded radially by the inner lateral surface of the outer bearing ring and bounded axially by an imaginary plane which is oriented perpendicularly to the bearing axis and extends from the end surface of the outer bearing ring, the sealing arrangement, comprising:
    at least a first support being at least partially rotationally fixed on an outer lateral surface of the outer bearing ring;
    at least one elastic seal fixed to the first support; and
    a second support having at least one encoder, which is orientated radially outwardly, arranged outside the interspace;
    wherein the encoder engages around the inner bearing ring, and the encoder is covered fully at least in a radial direction and at least partially in an axial direction by means of a covering element, the covering element being rotationally fixed on one of the bearing rings and rotatable relative to the encoder, and
    wherein neither the encoder, nor the sensor penetrate into the interspace, the first support being formed integrally with the covering element, and the covering element being interposed between the encoder and the sensor.

2. The sealing arrangement as claimed in claim 1, wherein the seal abuts the inner ring.

3. The sealing arrangement as claimed in claim 1, wherein the covering element at least partially covers the seal.

4. The sealing arrangement as claimed in claim 1, wherein the first support is made of sheet metal.

5. The sealing arrangement as claimed in claim 4, wherein the covering element is fixed on a radially outer surface section of the outer bearing ring.

6. The sealing arrangement as claimed in claim 5, wherein, starting from the outer bearing ring, the covering element first of all extends axially away from the outer bearing ring and radially beyond the encoder, and covers the encoder in the radial direction in the process, in that the covering element then extends radially inward and covers the encoder and the interspace in the axial direction in the process, and in that the covering element, finally, extends axially in the direction of rolling bodies and accommodates the seal.

7. The sealing arrangement as claimed in claim 4, wherein the covering element is fixed on an inner surface of the outer bearing ring.

* * * * *